(12) United States Patent
Koyo et al.

(10) Patent No.: US 7,399,721 B2
(45) Date of Patent: *Jul. 15, 2008

(54) GLASS FOR LASER PROCESSING

(75) Inventors: Hirotaka Koyo, Osaka (JP); Keiji Tsunetomo, Osaka (JP)

(73) Assignee: Nippon Sheet Glass Company, Limited, Osaka (JP)

( * ) Notice: Subject to any disclaimer, the term of this patent is extended or adjusted under 35 U.S.C. 154(b) by 474 days.

This patent is subject to a terminal disclaimer.

(21) Appl. No.: 10/522,046

(22) PCT Filed: Jul. 22, 2003

(86) PCT No.: PCT/JP03/09227

§ 371 (c)(1),
(2), (4) Date: Jan. 19, 2005

(87) PCT Pub. No.: WO2004/009504

PCT Pub. Date: Jan. 29, 2004

(65) Prior Publication Data

US 2005/0233889 A1    Oct. 20, 2005

(30) Foreign Application Priority Data

Jul. 24, 2002    (JP) .............................. 2002-214983

(51) Int. Cl.
C03C 3/089    (2006.01)
C03C 3/091    (2006.01)
C03C 3/093    (2006.01)

(52) U.S. Cl. .............................. 501/65; 501/66; 501/68; 501/69; 501/72; 501/55

(58) Field of Classification Search .................. 501/55, 501/65, 72, 66, 68, 69
See application file for complete search history.

(56) References Cited

U.S. PATENT DOCUMENTS

| | | | | |
|---|---|---|---|---|
| 4,367,919 A | * | 1/1983 | Tung et al. ................... | 359/538 |
| 4,444,893 A | | 4/1984 | Mader et al. | |
| 4,567,104 A | * | 1/1986 | Wu .............................. | 428/410 |
| 5,039,631 A | * | 8/1991 | Krashkevich et al. ......... | 501/64 |
| 5,300,467 A | * | 4/1994 | Ishizaki et al. ................ | 501/67 |

(Continued)

FOREIGN PATENT DOCUMENTS

| | | |
|---|---|---|
| DE | 43 06 004 A1 | 9/1993 |
| DE | 19917921 C1 * | 6/2000 |
| JP | 11-217237 A | 8/1999 |

*Primary Examiner*—Jerry A. Lorengo
*Assistant Examiner*—Elizabeth A Bolden
(74) *Attorney, Agent, or Firm*—Hamre, Schumann, Mueller & Larson, P.C.

(57) ABSTRACT

A glass for laser processing of the present invention can be laser-processed by causing ablation or evaporation by laser beam energy absorbed therein, wherein the glass for laser processing has a composition that satisfies the following conditions:

$$60 \leq SiO_2 + B_2O_3 \leq 79 \text{ mol } \%;$$

$$5 \leq Al_2O_3 + TiO_2 \leq 20 \text{ mol } \%; \text{ and}$$

$$5 \leq Li_2O + Na_2O + K_2O + Rb_2O + Cs_2O + MgO + CaO + SrO + BaO \leq 20 \text{ mol } \%,$$

where $5 \leq TiO_2 \leq 20$ mol %. The present invention can provide a glass for laser processing that has a low laser processing threshold value as well as a low thermal expansion coefficient.

7 Claims, 2 Drawing Sheets

U.S. PATENT DOCUMENTS

| | | |
|---|---|---|
| 6,262,389 B1 | 7/2001 | Koyama et al. |
| 6,376,402 B1 * | 4/2002 | Pannhorst et al. ............. 501/66 |
| 6,562,523 B1 * | 5/2003 | Wu et al. ....................... 430/5 |
| 2003/0045420 A1 | 3/2003 | Koyama et al. |
| 2003/0100431 A1 | 5/2003 | Koyo et al. |
| 2003/0114292 A1 * | 6/2003 | Kolberg et al. ................ 501/65 |
| 2003/0217568 A1 | 11/2003 | Koyo et al. |

* cited by examiner

GLASS FOR LASER PROCESSING

TECHNICAL FIELD

The present invention relates to a glass for laser processing that can be laser-processed through laser beam irradiation. Particularly, the present invention relates to a glass for laser processing whose composition is suitable for laser processing.

BACKGROUND ART

Recently, the technique of processing materials using laser beam energy has been developing gradually to cover the field of micro-processing.

In the processing technique using a mask pattern, the processable length has been extended to the range of nanometers that are further shorter than micrometers due to the progress of the patterning technique and the shortening of a laser wavelength.

On the other hand, direct processing using a laser also has been practiced in the range of micrometers in the case of processing metal and organic matters such as polyimide as a result of the progress in shortening of the wavelength and pulse width of laser beams.

Furthermore, processing such as perforating using a laser is shifting to ablation processing from thermal processing. Ablation is a phenomenon that the state of a material of an irradiation part shifts from melting to evaporation in a short period of time through irradiation of laser beams whose pulse width is very narrow. The level of thermal influence on the periphery of the beam irradiation part varies with an increase or a decrease in pulse width. In the case of processing using an ultrashort pulse laser that completes beam irradiation before thermal diffusion occurs, it is possible to make precise minute holes, with hardly any heat-affected layer being generated.

However, many of the lasers that are used for actual processing employ pulse widths of at least the nanosecond order, which makes it impossible to avoid the thermal influence. Hence, a photochemical reaction that is caused by ultraviolet rays is employed. Short-wavelength beams of a laser such as, for instance, an excimer laser have great energy per photon and therefore can cut a chemical bond that forms a molecular skeleton.

As described above, the selection of, for instance, the pulse width and wavelength of a laser beam to be used for irradiation conventionally has made it possible to carry out micro-processing. The study, however, has not progressed so much from the viewpoint of improvement of materials to be irradiated with a laser. Processing of glass that is a transparent material is important for optical application. In order to provide a glass suitable for laser processing, JP11(1999)-217237A proposes a technique for providing glass in which cracks tend not to occur by decreasing the laser processing threshold value through the introduction of silver into glass by ion exchange.

Glass containing a large amount of alkali metal allows silver ions to be introduced thereinto by a silver ion exchange. However, a phenomenon occurs in which silver ions are reduced in the vicinity of the glass surface and thereby are inhibited from differing into the glass. Hence, the effective laser processing region is limited to the vicinity of the glass surface and therefore it still is difficult to carry out processing of glass including processing of the inner part thereof, for instance, processing to make a through hole in a glass sheet.

In addition, there is another problem that the ion exchange rate is low and it therefore is difficult to allow ions to reach the inner part of glass.

Moreover, glass for laser processing produced through the silver ion exchange contains a large amount of alkali metal or alkaline-earth metal and therefore has a high thermal expansion coefficient, which is a problem. Since heat is generated in a laser irradiation part during laser processing, the laser irradiation part and the vicinity thereof are deformed due to the stress caused by the difference in thermal expansion between them. When the thermal expansion coefficient of the glass is high, the size of a processing part measured during laser irradiation varies from that measured after laser irradiation. Hence, the dimensional accuracy of the processing part may deteriorate.

Furthermore, with respect to optical elements, it generally is desirable that the dimensional change that is caused by a temperature change be small. There also is a problem that such a dimensional change as described above may cause variations in the characteristics of optical elements.

DISCLOSURE OF THE INVENTION

In order to solve the above-mentioned problems, the present invention is intended to provide a glass for laser processing that has a low laser processing threshold value as well as a low thermal expansion coefficient.

The glass for laser processing of the present invention is a glass that can be laser-processed by causing ablation or evaporation by laser beam energy absorbed therein. The glass for laser processing is characterized in having a composition that satisfies the following conditions:

$60 \leq SiO_2 + B_2O_3 \leq 79$ mol %;

$5 \leq Al_2O_3 + TiO_2 \leq 20$ mol %; and $5 \leq Li_2O + Na_2O + K_2O + Rb_2O + Cs_2O + MgO + CaO + SrO + BaO \leq 20$ mol %, wherein $5 \leq TiO_2 \leq 20$ mol %.

BEST MODE FOR CARRYING OUT THE INVENTION

Figure 1:
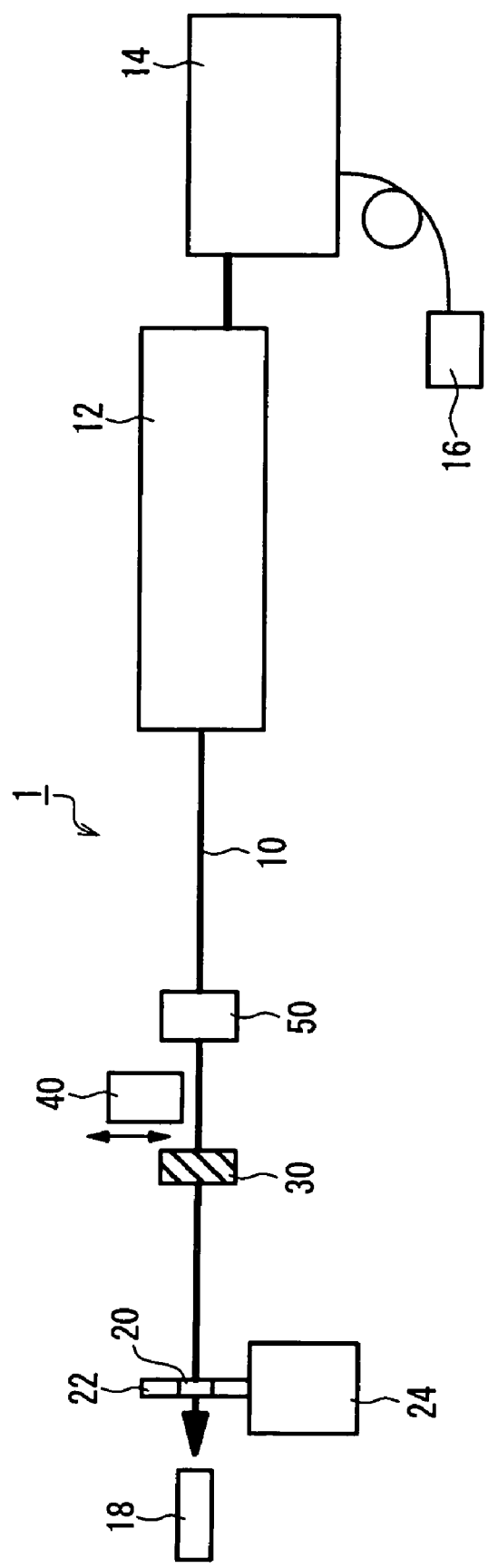
FIG. 1 is a schematic view showing an optical system used for measuring a laser processing threshold value of an example according to the present invention.

A glass of the present invention can be processed by causing ablation or evaporation by laser beam energy absorbed therein. In the above, the term "ablation" denotes a phenomenon that the state of a material of an irradiation part shifts from melting to evaporation in a short period of time through irradiation of laser beams whose pulse width is very narrow.

The composition of the glass according to the present invention satisfies the following conditions:

$60 \leq SiO_2 + B_2O_3 \leq 79$ mol %;

$5 \leq Al_2O_3 + TiO_2 \leq 20$ mol %; and $5 \leq Li_2O + Na_2O + K_2O + Rb_2O + Cs_2O + MgO + CaO + SrO + BaO \leq 20$ mol %, wherein $5 \leqq TiO_2 \leqq 20$ mol %.

Preferably, this glass for laser processing contains titanium in the form of an atom, colloid, or ion.

In the glass having the composition described above, $SiO_2$ and $B_2O_3$ are oxides that form a network of the glass, and they form a skeleton of the glass. When the total amount of $SiO_2$ and $B_2O_3$ exceeds 79 mol %, the glass is difficult to melt. The total amount, therefore, is preferably 79 mol % or less.

Furthermore, since $Li_2O$, $Na_2O$, $K_2O$, $Rb_2O$, $Cs_2O$, $MgO$, $CaO$, $SrO$, or $BaO$, which is a modifier oxide, breaks part of the network structure of the glass, it is used for reducing viscosity to be obtained at high temperatures or decreasing the temperature gradient of viscosity. In order for this effect to be exhibited readily, it is preferable that the total amount of the modifier oxides be at least 5 mol %.

$Al_2O_3$ and $TiO_2$ are intermediate oxides and can be present in the glass as either a network forming oxides or a modifier oxides according to the balance between $SiO_2$ and $B_2O_3$, which are network forming oxides, and $Li_2O$, $Na_2O$, $K_2O$, $Rb_2O$, $Cs_2O$, $MgO$, $CaO$, $SrO$, and $BaO$ which are modifier oxides. Particularly, $TiO_2$ is a component that is necessary for lowering the laser processing threshold value. It, therefore, is necessary that the content of $TiO_2$ be 5 mol % to 20 mol %. A content of $TiO_2$ of less than 5 mol % results in a high laser processing threshold value, which is not preferable. On the other hand, a content of $TiO_2$ exceeding 20 mol % results in a high thermal expansion coefficient, which is not preferable.

When the total amount of $Al_2O_3$ and $TiO_2$ exceeds the total amount of the modifier oxides, vitrification is difficult. Accordingly, it is preferable that the total amount of $Al_2O_3$ and $TiO_2$ be 20 mol % or less.

The glass having the composition described above is allowed to have a low thermal expansion coefficient by increasing the content of the components $SiO_2$ and $B_2O_3$, which are network forming oxides, and minimizing the content of $Li_2O$, $Na_2O$, $K_2O$, $Rb_2O$, $Cs_2O$, $MgO$, $CaO$, $SrO$, and $BaO$ which are modifier oxides. In order for the glass to contain a large amount of $SiO_2$ and $B_2O_3$, which are network forming oxides, the total amount of $SiO_2$ and $B_2O_3$ is set at 60 mol % or more. On the other hand, in order for the glass to contain a smallest possible amount of $Li_2O$, $Na_2O$, $K_2O$, $Rb_2O$, $Cs_2O$, $MgO$, $CaO$, $SrO$, and $BaO$, which are modifier oxides, the total amount thereof is set at 20 mol % or less.

In order to obtain more uniform glass with a common melting method, it is desirable that the composition satisfy the following condition, within the composition range described above:

$$(Al_2O_3+TiO_2)/(Li_2O+Na_2O+K_2O+Rb_2O+Cs_2O+MgO+CaO+SrO+BaO) \leqq 0.9.$$

Moreover, from the viewpoint of both the decrease in thermal expansion coefficient and improvement in laser processability, a particularly preferable glass composition satisfies the following ranges:

$$70 \leqq SiO_2+B_2O_3 79 \leqq \text{mol \%};$$

$$10 \leqq TiO_2 \leqq 15 \text{ mol \%; and}$$

$$10 \leqq Na_2O \leqq 15 \text{ mol \%}.$$

In this case, the thermal expansion coefficient further can decrease when the total amount of $SiO_2$ and $B_2O_3$, which are network forming oxides, is at least 70 mol % and the amount of $Na_2O$, which is a modifier oxide, is 15 mol % or less.

Furthermore, when the content of $TiO_2$, which is a component required for lowering the laser processing threshold value, is at least 10 mol %, the laser processability further can improve. However, when the content of $TiO_2$ is larger than that of $Na_2O$, which is a modifier oxide, vitrification is difficult. Accordingly, it is preferable that the content of $TiO_2$ be 15 mol % or less.

Since the total amount of $SiO_2$ and $B_2O_3$, which are network forming oxides, is at least 70 mol %, it is preferable that the content of $Na_2O$, which is a modifier oxide, be at least 10 mol %. This is intended to reduce the viscosity to be obtained at high temperatures and decrease the temperature gradient of viscosity through the increase in content of the modifier oxide.

When glass absorbs laser beams, variations in glass structure or absorptance occur to cause ablation or evaporation. The glass having the aforementioned composition of the present invention requires less energy to be processed by causing the phenomenon and therefore has a low processing threshold value. Furthermore, the glass for laser processing of the present invention is not modified through, for instance, an ion exchange but is allowed to have a necessary composition by melting. Accordingly, the composition of the glass is allowed to be substantially uniform in the thickness direction. Hence, it is possible to carry out easily not only processing of the vicinity of the glass surface but also processing of the inner part of the glass, such as, for instance, processing for making a through hole in a glass sheet. In the above, the phrase, "substantially uniform in the thickness direction", denotes that the glass composition is uniform to an extent that allows even the inner part of the glass to be laser-processed.

Preferably, the glass of the present invention has a thermal expansion coefficient of $100 \times 10^{-7 \circ}$ C.$^{-1}$ or lower.

Preferably, the glass of the present invention has processing threshold values of 60 mW or lower at a wavelength of 266 nm and 500 mW or lower at a wavelength of 355 nm as well as a thermal expansion coefficient of $100 \times 10^{-7 \circ}$ C.$^{-1}$ or lower, where ultraviolet rays with the wavelengths of 266 nm and 355 nm of a Nd:YAG laser were used as laser beams, the laser has a frequency of 20 Hz and a pulse width of 5 to 8 nm, the laser beams are focused with a lens whose focal length is 100 mm, and the processing threshold values denote energy used at the limit of causing ablation by irradiating the glass with the laser beams.

EXAMPLES

Examples in which the present invention is used are described below, but the present invention is not limited to them.

(1) Method of Producing Glass

Raw materials were blended so that 200 g of glass was to be produced. This was put into a platinum crucible, which then was placed in a melting furnace whose temperature had been raised to about 1500° C. This was maintained for six hours while being stirred several times. Casting was carried out by pouring the glass on an iron plate. Immediately thereafter, it was placed in an annealing furnace whose temperature had been raised to about 500° C. It then was maintained at a predetermined temperature for 30 minutes and then was cooled slowly to room temperature over 16 hours. A glass block thus obtained was cut and polished by a common method. Thus a sheet-like sample of glass for laser processing with smooth surfaces was prepared.

(2) Measurement of Laser-Irradiation Processing Threshold Value

A glass substrate was processed by laser irradiation as follows using a laser irradiation device 1 shown in FIG. 1.

A laser beam 10 emitted from a laser source 12 is focused by a lens (not shown in FIG. 1) and then a glass sample 20 attached to a sample holder 22 located on a sample stage 24 is irradiated therewith. An attenuator 50 is a device for changing the level of energy of the laser beam that passes therethrough. An operation of a micrometer (not shown in FIG. 1) allows the attenuator 50 to adjust the level of energy of the laser beam 10 that passes therethrough. The glass sample 20 is irradiated with the laser beam 10 whose energy level has been adjusted by the attenuator 50.

The sample stage 24 is a stage that freely can move three-dimensionally around one axis extending in the direction parallel to the optical axis of the laser beam 10 and two axes extending in the plane perpendicular to the optical axis of the laser beam 10. The sample stage 24 can be moved by electric signals and thereby can be controlled as predetermined.

The sample holder 22 can be tilted freely with respect to the direction of the optical axis of the laser beam 10. The type of the laser beam 10 can be selected from the third harmonics (whose wavelength is 355 nm) and the fourth harmonics (whose wavelength is 266 nm) of a Nd:YAG laser and laser beams of a KrF excimer laser (whose wavelength is 248 nm) by changing the laser source 12. Furthermore, a mask (not shown in FIG. 1) was placed on the optical axis in the vicinity of the glass sample 20 as required, and thereby the diameter or size of the laser beam was changed.

The laser processing threshold value was measured as follows. Ultraviolet rays with wavelengths of 266 nm and 355 nm of the Nd:YAG laser were used as the laser beam 10. This laser had a pulse rate of 20 Hz and a pulse width of 5 to 8 nm. The laser beam 10 was focused by a lens (not shown in FIG. 1) whose focal length was 100 mm. The glass sample 20 attached to the sample holder 22 located on the sample stage 24 was irradiated with the laser beam 10 thus focused. The irradiation time was controlled with an irradiation shutter 30 and was set at two seconds.

Energy of the laser beam 10 was measured with a power meter 40 placed on an optical path of the laser beam 10 in the state where the irradiation shutter 30 was closed. The sample was irradiated with laser beams whose energy level was changed variously by the attenuator 50, and the amount of energy used at the limit of causing ablation was determined, which was defined as the processing threshold value.

The laser source 12 generates high energy beams. Hence, for ensuring safety, the laser source 12 can be controlled remotely. A device 14 that supplies power and cooling water to the laser source 12 is operated with a remote controller 16. The laser source 12 itself also contains a shutter although it is not specifically shown in FIG. 1. This shutter also can be controlled remotely. Laser beams that have passed through the glass sample 20 are absorbed by a beam damper 18.

(3) Measurement of Thermal Expansion Coefficient

Measurement of the thermal expansion coefficient was carried out according to Japanese Industrial Standards, JIS R3103.

Examples in which the present invention is used are described below, but the present invention is not limited to them.

Examples 1 to 12

The compositions of glasses for laser processing of the present invention according to Examples 1 to 12 are indicated in Table 1. The compositions of respective components are within the following ranges:

a. network forming oxides ($SiO_2$ and $B_2O_3$): 60 to 79 mol %;
b. intermediate oxides ($Al_2O_3$ and $TiO_2$): 5 to 20 mol %, wherein the content of $TiO_2$ must be 5 to 20 mol %; and
c. modifier oxides ($Li_2O$, $Na_2O$, $K_2O$, MgO, CaO, SrO, and BaO): 5 to 20 mol %.

The glass for laser processing of the present invention consists substantially only of the compositions described above except for a very small amount of impurities.

The samples of glasses for laser processing having compositions mentioned above were irradiated with respective laser beams having wavelengths of 266 nm and 355 nm, with the irradiation energy being varied. Table 1 shows the processing threshold values obtained as a result.

It can be understood that in both the cases of using the respective wavelengths, the processing threshold value decreases considerably with an increase in concentration of $TiO_2$. However, the processing threshold value hardly depends on the compositions of the network forming oxides and modifier oxides.

Figure 2:
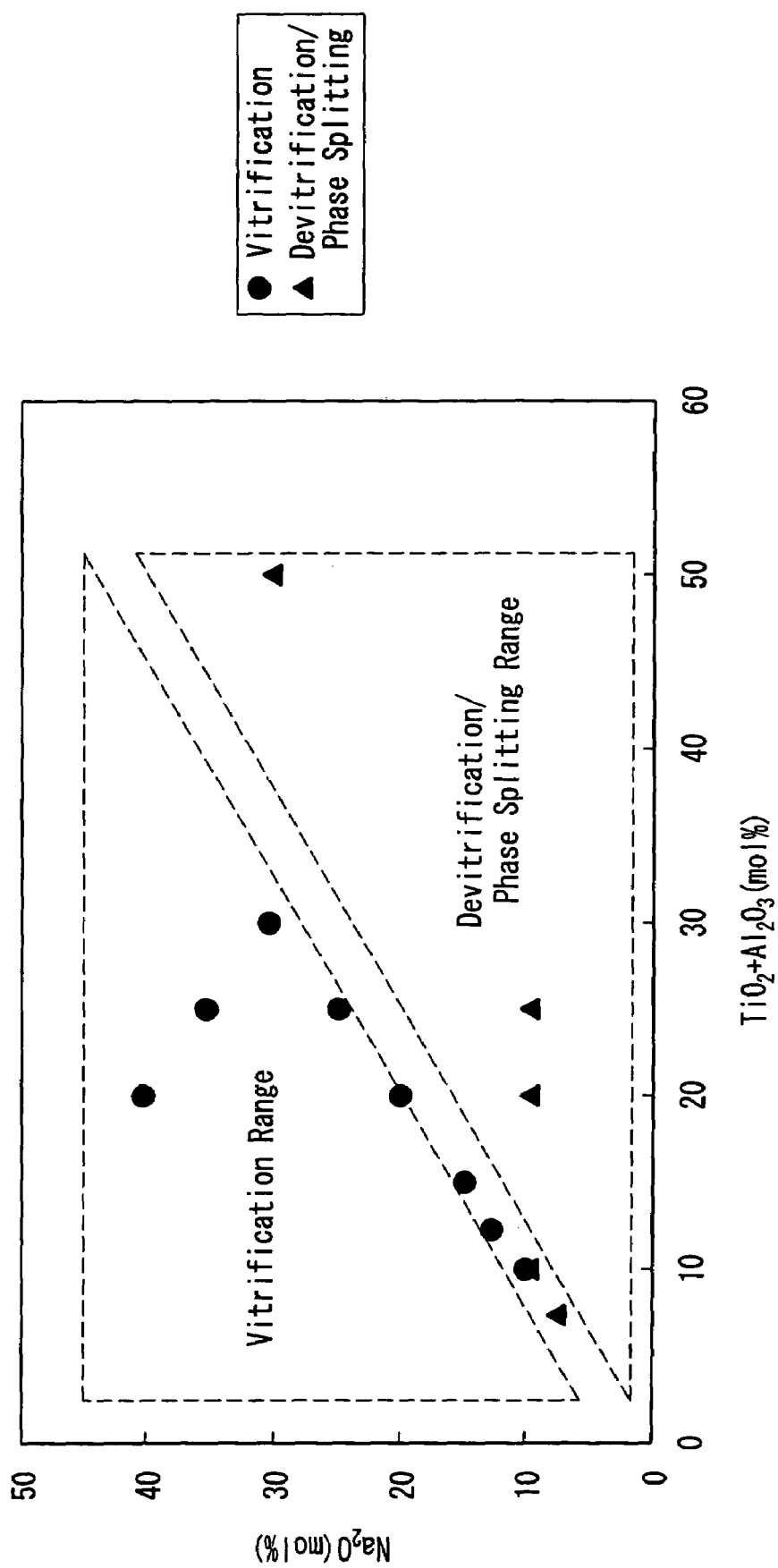
FIG. 2 is a diagram showing a composition range in which uniform glass can be produced in an example according to the present invention.

FIG. 2 shows vitrification conditions of respective compositions, with the relationship between the total amount of $Al_2O_3$ and $TiO_2$ and the amount of $Na_2O$ being plotted with respect to various compositions tested by the inventors. It can be understood from FIG. 2 that an excessively small amount of modifier oxides that are typified by $Na_2O$ causes phase splitting and devitrification and thus prevents uniform glass from being produced. That is, in order to produce uniform glass, the total amount of $Al_2O_3$ and $TiO_2$ and the total amount of modifier oxides must satisfy the relationship of:

$$(Al_2O_3+TiO_2)/(Li_2O+Na_2O+K_2O+Rb_2O+Cs_2O+MgO+CaO+SrO+BaO) \leq 0.9 \qquad (1)$$

As described above, in order to decrease the laser processing threshold value, the glass needs to contain a large amount of $TiO_2$. In this case, in order to satisfy the condition of the formula (1), it is necessary to increase the concentration of the modifier oxides. The increase in concentration of the modifier oxides, however, generally results in an increase in thermal expansion coefficient. Accordingly, it can be understood that the decrease in the processing threshold value and the decrease in the thermal expansion coefficient have a trade-off relationship.

Comparative Example 1

Comparative Example 1 is a so-called soda-lime glass that is used for common window glass, for instance. The processing threshold values were determined in the same manner as in the examples. The maximum power was 1.10 W at a laser beam wavelength of 266 nm while it was 2.10 W at a laser beam wavelength of 355 nm. In both the cases, neither ablation nor evaporation occurred and thus no change was observed in the sample. Compositions having a very low concentration of $TiO_2$ or $Al_2O_3$, which is an intermediate oxide, or containing no $TiO_2$ or $Al_2O_3$ result in extremely high processing threshold values.

Comparative Example 2

As shown in Table 1, Comparative Example 2 is a material containing $TiO_2$, which is an intermediate oxide, and $Na_2O$, which is a modifier oxide, each of which has a high concentration exceeding 20 mol %. The processing threshold values were determined in the same manner as in the examples and were very low, specifically 15 mW and 200 mW at laser beam wavelengths of 266 nm and 355 nm, respectively. However, the respective glass compositions of the aforementioned examples have thermal expansion coefficients that are lower than $100 \times 10^{-7} °C.^{-1}$ while the glass having the composition of this comparative example has a thermal expansion coefficient as high as $118 \times 10^{-7}$ °C.$^{-1}$.

When the examples and comparative examples described above are taken into account, it turns out that in obtaining a glass whose thermal expansion coefficient is as low as possible and whose processing threshold value also is low, the most preferable compositions are compositions that are typified by Examples 11 and 12, i.e. compositions that satisfy the condition of the formula (1) described above and additionally are in the following ranges:

$70 \leq SiO_2 + B_2O_3 \leq 79$ mol %;

$10 \leq TiO_2 \leq 15$ mol %; and $10 \leq Na_2O \leq 15$ mol %.

TABLE 1

| Components (mol %) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | C. Ex. 1 | C. Ex. 2 |
|---|---|---|---|---|---|---|---|---|---|---|---|---|---|---|
| $SiO_2$ | 60 | 60 | 60 | 60 | 60 | 60 | 60 | 60 | 60 | 60 | 60 | 65 | 72 | 37.5 |
| $B_2O_3$ | 0 | 0 | 0 | 0 | 0 | 0 | 0 | 0 | 0 | 10 | 10 | 10 | 0 | 12.5 |
| $TiO_2$ | 10 | 20 | 20 | 20 | 20 | 10 | 20 | 20 | 20 | 10 | 15 | 12.5 | 0 | 25 |
| $Al_2O_3$ | 10 | 0 | 0 | 0 | 0 | 10 | 0 | 0 | 0 | 0 | 0 | 0 | 0.9 | 0 |
| $Na_2O$ | 10 | 20 | 15 | 15 | 15 | 15 | 15 | 15 | 10 | 10 | 15 | 12.5 | 12.7 | 25 |
| $Li_2O$ | 0 | 0 | 5 | 0 | 0 | 0 | 0 | 0 | 0 | 0 | 0 | 0 | 0 | 0 |
| $K_2O$ | 0 | 0 | 0 | 5 | 0 | 0 | 0 | 0 | 0 | 0 | 0 | 0 | 0 | 0 |
| MgO | 0 | 0 | 0 | 0 | 5 | 0 | 0 | 0 | 0 | 0 | 0 | 0 | 6 | 0 |
| CaO | 0 | 0 | 0 | 0 | 0 | 5 | 0 | 0 | 0 | 0 | 0 | 0 | 8.4 | 0 |
| SrO | 0 | 0 | 0 | 0 | 0 | 0 | 5 | 0 | 0 | 0 | 0 | 0 | 0 | 0 |
| BaO | 10 | 0 | 0 | 0 | 0 | 0 | 0 | 5 | 10 | 10 | 0 | 0 | 0 | 0 |
| Total | 100 | 100 | 100 | 100 | 100 | 100 | 100 | 100 | 100 | 100 | 100 | 100 | 100 | 100 |
| Processing Threshold Value (mW) | | | | | | | | | | | | | | |
| Wavelength: 266 nm | 60 | 25 | 25 | 25 | 25 | 25 | 225 | 25 | 25 | 60 | 30 | 30 | — | 15 |
| Wavelength: 355 nm | 500 | 300 | 300 | 300 | 300 | 300 | 300 | 300 | 300 | 500 | 400 | 400 | — | 200 |
| Thermal Expansion Coefficient (°C.$^{-1}$) | 82 | 97 | 94 | 99 | 86 | 89 | 90 | 91 | 87 | 82 | 75 | 64 | — | 118 |

Remarks:
"Thermal Expansion Coefficient" is indicated as the value to be multiplied by $10^{-7}$.
"Ex." and "C. Ex." denote Example and Comparative Example, respectively.

INDUSTRIAL APPLICABILITY

The present invention can provide a glass for laser processing that has a low laser processing threshold value as well as a low thermal expansion coefficient. In other words, the glass for laser processing of the present invention requires less laser beam energy to be processed and is affected less by heat. Thus, the glass for laser processing can be processed more precisely.

The invention claimed is:

1. A glass for laser processing that can be laser-processed by causing ablation or evaporation by laser beam energy absorbed therein,
   wherein the glass for laser processing has a composition that comprises
   at least one selected from the group consisting of $SiO_2$ and $B_2O_3$ as a network forming oxide,
   at least one selected from the group consisting of $Al_2O_3$ and $TiO_2$ as a intermediate oxide, and
   at least one selected from the group consisting of $Li_2O$, $Na_2O$, $K_2O$, $Rb_2O$, $Cs_2O$, MgO, CaO, SrO and BaO as a modifier oxide,
   satisfies the following conditions:

$60 \leq SiO_2 + B_2O_3 \leq 79$ mol %;

$10 \leq Al_2O_3 + TiO_2 \leq 20$ mol %; and $5 \leq Li_2O + Na_2O + K_2O + Rb_2O + Cs_2O + MgO + CaO + SrO + BaO \leq 20$ mol %, where $10 \leq TiO_2 \leq 20$ mol % and 10 mol % $\leq Na_2O$,
   the composition is substantially uniform in a direction of thickness of the glass, and
   the glass for laser processing has processing threshold values of 60 mW or lower at a wavelength of 266 nm and 500 mW or lower at a wavelength of 355 nm, where the processing threshold values denote energy used at the limit of causing ablation.

2. The glass for laser processing according to claim 1, wherein the composition satisfies the following condition:

$(Al_2O_3 + TiO_2)/(Li_2O + Na_2O + K_2O + Rb_2O + Cs_2O + MgO + CaO + SrO + BaO) \leq 0.9$.

3. The glass for laser processing according to claim 1, wherein the composition satisfies the following conditions:

$70 \leq SiO_2 + B_2O_3 \leq 79$ mol %;

$10 \leq TiO_2 \leq 15$ mol %; and $10 \leq Na_2O \leq 15$ mol %.

4. The glass for laser processing according to claim 1, wherein the glass for laser processing has a thermal expansion coefficient of $100 \times 10^{-7}$ °C.$^{-1}$ or lower.

5. The glass for laser processing according to claim 1, wherein the composition of the glass for laser processing comprises each of $SiO_2$, $B_2O_3$, $TiO_2$ and $Na_2O$.

6. A glass for laser processing according to claim 1, wherein the glass for laser processing has a composition that consists essentially of:
   at least one selected from the group consisting of $SiO_2$ and $B_2O_3$ as a network forming oxide,
   at least one selected from the group consisting of $Al_2O_3$ and $TiO_2$ as a intermediate oxide, and
   at least one selected from the group consisting of $Li_2O$, $Na_2O$, $K_2O$, $Rb_2O$, $Cs_2O$, MgO, CaO, SrO and BaO as a modifier oxide.

7. A laser processing method of a glass that has a composition that comprises
- at least one selected from the group consisting of $SiO_2$ and $B_2O_3$ as a network forming oxide,
- at least one selected from the group consisting of $Al_2O_3$ and $TiO_2$ as an intermediate oxide, and
- at least one selected from the group consisting of $Li_2O$, $Na_2O$, $K_2O$, $Rb_2O$, $Cs_2O$, MgO, CaO, SrO and BaO as a modifier oxide, satisfies the following conditions:

$60 \leq SiO_2 + B_2O_3 \leq 79$ mol %;

$10 \leq Al_2O_3 + TiO_2 \leq 20$ mol %; and $5 \leq Li_2O + Na_2O + K_2O + Rb_2O + Cs_2O + MgO + CaO + SrO + BaO \leq 20$ mol %, where $10 \leq TiO_2 \leq 20$ mol % and 10 mol % $\leq Na_2O$,
the composition is substantially uniform in a direction of thickness of the glass,
the method comprising:
processing the glass by irradiation with a laser beam where the laser beam is selected from the group consisting of laser beams with wavelength of 266 nm of a Nd:YAG laser, of 355 nm of a Nd:YAG laser and of 248 nm of a KrF excimer laser.

* * * * *